Patented Aug. 4, 1936

2,049,878

UNITED STATES PATENT OFFICE 2,049,878

COMPOSITE ARTICLE

Carlo Stresino, Milwaukee, Wis., assignor to A. O. Smith Corporation, Milwaukee, Wis., a corporation of New York No Drawing. Application August 3, 1934, Serial No. 738,290

5 Claims. (Cl. 311—106)

This invention relates to the art of plastic molding.

An object of the invention is to provide a composite molded article with a surface resistant to the action of heat.

A more specific object of the invention is to provide a composite slab suitable for use as a table top, the slab being molded from thermo-setting resins associated with suitable filling materials.

One of the properties desired in a table top is that it be resistant to the action of heat in order that it may not be damaged by lighted cigars or cigarettes left on the table. Furthermore, it is apparent that for an article such as a table top the finished surface must be resistant to the action of heat, and that it is not sufficient to provide a slab of which one surface presents a finished appearance while the other surface is resistant to the action of heat.

Methods of producing articles in which one face is resistant to the action of heat while the opposite face presents a finished appearance are known to the art and are shown, for example, in U. S. Patent No. 1,960,180. This patent discloses a molded article pressed from asbestos sheets impregnated with sodium silicate, asbestos sheets impregnated with a phenol resin, and a phenol resin molding powder. The surface of the article formed by the asbestos sheets impregnated with sodium silicate is resistant to the action of heat; the other surface, which is formed by the molding powder, presents a finished appearance. But it is clear that however useful such an article may be for many purposes, it does not meet the requirements for a structure such as a table top in which one and the same surface must present a finished appearance and also be resistant to the action of heat.

My invention relates to a molded article with a surface which meets these requirements. It is based upon the discovery that in articles molded from thermo-setting resins, heat resistance may be imparted to a surface by placing material which contains a heat resisting filler such as asbestos, behind the surface which is to be protected from the injurious effects of heat, that is, on the side of the surface opposite to the side which is exposed to the source of heat. By suitable organization of the material entering into the structure of the molded article in accordance with this invention, it has been possible to produce molded slabs such as table tops which have a finished surface so resistant to the action of heat that a lighted cigarette placed upon the finished surface of the table top and allowed to burn until it is completely consumed, either leaves no mark at all, or under unfavorable conditions as when the combustion of the cigarette is accelerated by the action of a draft of air, leaves a scar that is scarcely perceptible. Similar treatment is extremely injurious to a table top made of wood, or to a table top molded from resinous materials unless the elements entering into the fabrication of the table top are arranged in accordance with the invention to provide a heat resistant surface.

In the articles made in accordance with this invention, the surface is formed of a thin film of resin, which may, in one embodiment of the invention, be associated with a fibrous filling material such as a sheet of paper or fabric. Behind this there is a layer of material which contains a heat resisting substance such as asbestos, and back of the layer of heat resistant material there is the material which forms the body of the article. Asbestos is a naturally occurring mineral composed of different oxides and is well known for its resistance to the action of heat. Other mineral substances such as the oxides of silicon, zirconium, aluminum, magnesium, titanium, and other metals are also resistant to the action of heat and find extensive use as refactories for this reason. Such mineral substances may be used in place of asbestos in the heat resistant layer, but in general the asbestos is to be preferred because of its occurrence in the form of fibers which are better adapted to use with resin than are the non-fibrous materials.

While the methods of this invention are applicable to the manufacture of articles of different shape or size, they are conveniently illustrated in connection with the molding of a slab suitable for use as a table top.

In accordance with one way of making the article of this invention, the bottom of a suitable molding die is sprayed or painted with a varnish formed by dissolving resin in a solvent. The solvent is then allowed to evaporate, leaving a relatively thin film of resin on the bottom of the die. This film of resin, which is to form the surface of the table top, is then heated to cause a partial cure. It is important that the resin used for the formation of the surface be of such quality that it is completely cured during the subsequent molding of the table top. Many thermo-setting resins of suitable properties are known to the art. Among the most widely known are the resins formed by the reaction between phenol or phenols and aldehydes, but other resins of similar properties may be used. Care should be taken that whatever resin is chosen for the formation of the surface should be of such properties as to react to its final insoluble, infusible form during the molding of the table top.

A layer of molding powder compounded of resin associated with asbestos filler is then charged above the surface film of resin, and above this layer of molding powder there is placed a layer of molding powder compounded of resin and wood flour filler. The table top is then molded by the application of heat and pressure to the material in the molding die. The table top thus produced has a surface film of resin, a layer of heat resisting material, and a layer of the material used for the body of the table top.

The resin which is used in the molding powder employed to form a heat resistant layer behind the surface film of resin should have properties smilar to those of the resin in the surface film, that is, it should react to its final infusible insoluble form during the molding of the table top. The same resin that is used for the surface of the table top may be used in the molding powder that is placed next to the surface, but other resins of similar properties may be used if desired.

It is not indispensable nor invariably desirable that the filler used in the molding powder next to the surface of the table top be solely constituted of abestos or other mineral substances resistant to the action of heat. Excellent results have been obtained with a backing layer composed of molding powder which contained wood flour as well as abestos filler. The following specific example gives an illustration of one molding powder which has been found suitable for backing up the surface film of resin. Wood flour, resin, carbon black, and hexamethylenetetramine are thoroughly mixed in the proportion of 60 parts of wood flour, 40 parts of resin, 6 parts carbon black, and 4 parts hexamethylenetetramine, and 75 parts of the molding powder thus formed are incorporated with 50 parts of asbestos, 50 parts of resin, 7.5 parts of hexamethylenetetramine, 6 parts of carbon black, 5 parts of tung oil, and 1 part of stearic acid. It is to be understood that the proportions of the ingredients can be varied and that some can be substituted by others or dispensed with entirely. The use of some wood flour as a filler in the backing up layer has been found to be an advantage in giving a greater uniformity between the properties of this layer and the properties of the layer behind it formed from a molding powder compounded from resin and a wood flour filler.

The layer of material which forms the body of the article is naturally protected against the action of heat applied to the surface of the article by the heat resistant layer interposed between it and the surface. The molding powder used to produce the body of the article does not require the properties of the backing up layer, and may be formed from resins which are not of quite as high quality as those which are used nearer the surface. Wood flour is a filler which is widely used in molding powders and is suitable for use in the molding powder employed to form the body of the table top.

The relative amounts of the molding powders used to form the backing up layer and the body of the article will depend upon the kind and thickness of the article and the conditions to which it is exposed. In molding table tops about three quarters of an inch thick, excellent results have been secured by using for the backing up layer about 5 per cent as much molding powder as is used for the body of the table top. This results in a finished table top in which the backing up layer is about 5 per cent the thickness of the table top. These proportions are suitable for the production of table tops of this thickness, but different proportions may be preferable for other articles, or for table tops of a different thickness.

In another way of making the article of this invention, the surface of the table top is formed by one or more sheets of resin impregnated paper or fabric. The resin used to impregnate the surface sheet or sheets should have the properties previously indicated as desirable for the resin used on the surface. A sheet of the resin impregnated paper or fabric is placed in the bottom of the mold, the molding powder used to form the backing up layer is distributed in a layer above it, and the molding powder used to form the body of the table top is added. Heat and pressure are applied to the die to unite these elements into a single structure.

Table tops with surfaces which have an excellent resistance to the action of heat can be thus produced by the use of resin impregnated paper for the surface despite that fact that paper and fabric are not in themselves heat resistant substances. The layer of backing material with its filler of asbestos or other heat resisting substance appears to protect the surface layer from injury even though the surface material is nearer the source of heat. If the layer of backing material is omitted and the surface layer, either a coating of varnish in the mold as in the first described modification, or resin impregnated paper as in the second, is applied directly to the molding powder compounded of resin and wood flour which is used to form the body of the table top, a table top is formed which is much more readily damaged by the effect of heat than the table top made in accordance with this invention.

While the description of my improved table top structure in its preferred embodiments has proceeded on the assumption that both the backing layer of heat resisting material and the body of the table top are formed from molding powder, it is clear that either one or both may be formed of synthetic resin associated with fibrous sheet material of suitable properties. Thus, instead of forming the backing layer from molding powder which contains asbestos filler, it could be made from asbestos sheets impregnated with resin, and the body of the article could be formed from resin impregnated sheet material instead of from molding powder. Other modifications can be made without departing from the spirit of this invention which contemplates a molded article composed of a layer of heat resistant material provided on one face with a layer of material suitable for the production of a finished surface and on the other face with a layer of material which forms the body of the article.

I claim:
1. A molded composite article with a finished surface resistant to the action of heat, said article comprising a surface film of resin forming the finished surface resistant to the action of heat, a layer of material forming the body of the article and containing a binder and a filler material, and a layer of material containing a resin and a heat-resistant filler interposed between the film of resin and the layer of material forming the body of the article.
2. A molded composite article with a finished surface resistant to the action of heat, said article comprising a surface film of resin forming the finished surface resistant to the action of heat, a layer of material forming the body of the article and containing a binder and a filler material, and a layer of material containing a heat-resistant mineral filler interposed between the film of resin and the layer of material forming the body of the article.

3. A molded table top which comprises a surface film of resin, a layer of material forming the body of the table top and containing wood flour and a resin, and a layer of heat-resistant material containing asbestos and a resin interposed between the surface film of resin and the layer of material forming the body of the table top.

4. A molded composite article having a finished surface resistant to the action of heat which comprises a surface film of resin, a layer of material forming the body of the article and containing a binder and a filler material, and a thinner layer of material containing a binder and a heat-resistant filler interposed between the surface film and the layer of material forming the body of the article.

5. A molded composite article with a finished surface resistant to the action of heat which comprises a surface film of resin, a layer of material forming the body of the article and containing a filler and a resin, and a layer of heat-resistant material containing asbestos and a resin interposed between the surface film of resin and the layer of material forming the body of the article.

CARLO STRESINO.